UNITED STATES PATENT OFFICE.

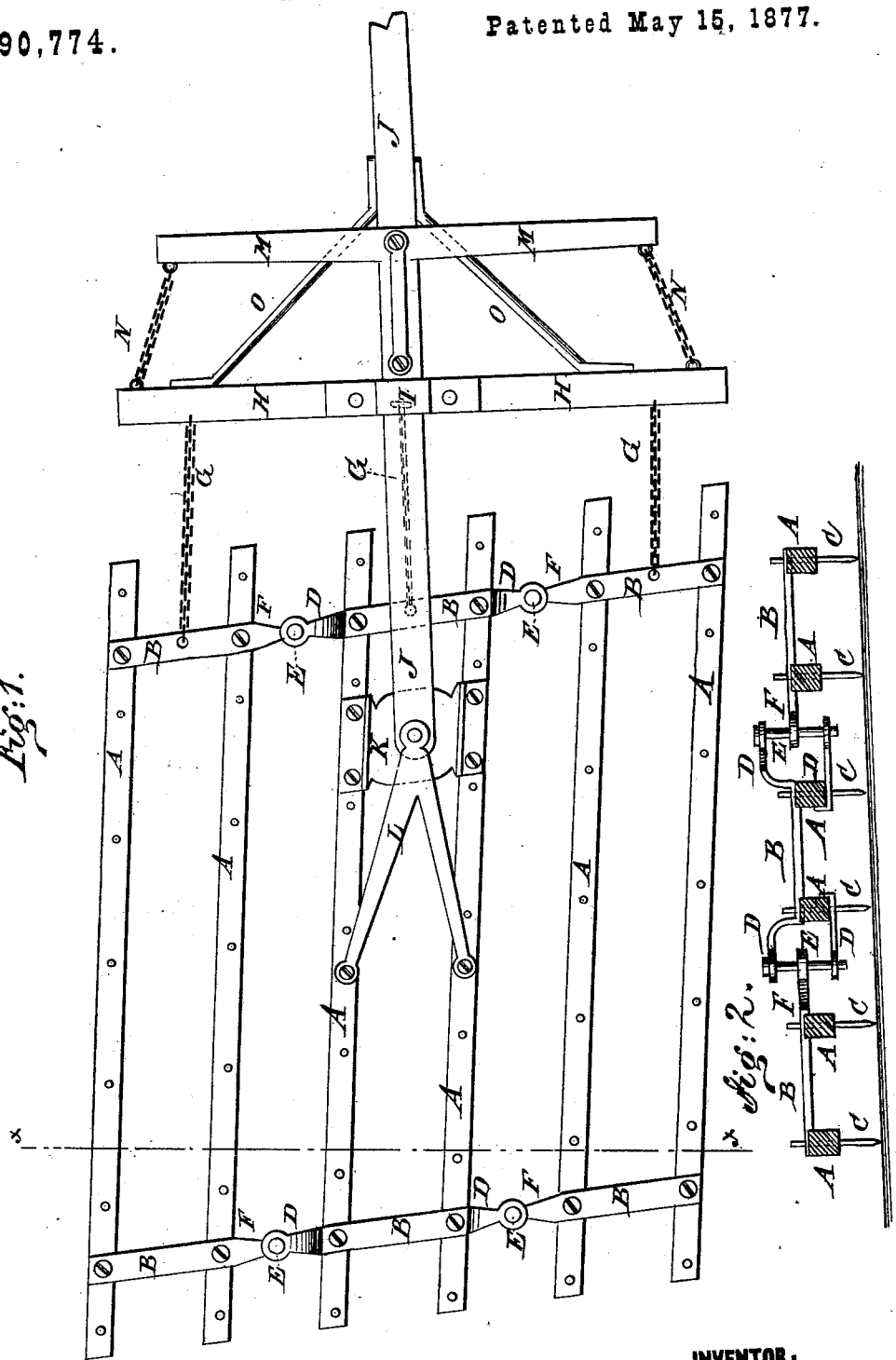

DAVID McILREVEY, OF RICEVILLE, IOWA.

IMPROVEMENT IN HARROWS.

Specification forming part of Letters Patent No. 190,774, dated May 15, 1877; application filed April 2, 1877.

*To all whom it may concern:*

Be it known that I, DAVID MCILREVEY, of Riceville, in the county of Mitchell and State of Iowa, have invented a new and useful Improvement in Harrows, of which the following is a specification:

Figure 1 is a top view of my improved harrow. Fig. 2 is a cross-section of the same, taken through the line $x\,x$, Fig. 1.

Similar letters of reference indicate corresponding parts.

The object of this invention is to furnish an improved harrow which shall be so constructed that it will adjust itself to any unevenness of the surface of the soil, and that it cannot injure the horses or the driver by being thrown against them, or by their getting upon it, and which shall be simple in construction and convenient in use, being readily adjusted into a large or a small harrow, as required.

The invention will first be described in connection with the drawing, and then pointed out in the claim.

The harrow is formed of three, five, or seven sections, and each section consists of two long beams, A, connected near their ends by short cross-bars B. The long bars A are connected in a slightly-inclined position, so that the teeth C, attached to the said beams or bars A, may describe paths parallel with and equally distant from each other.

To the beams A of the central section, near their ends, are attached two arms, D, the lower ones of which are horizontal, and the upper ones are curved upward and outward, as shown in Fig. 2, so as to bring the outer ends of the bars of each pair directly over each other and at some distance apart.

In the outer ends of the arms D are formed holes to receive a pin or bolt, E, which also passes through a hole in the end of an arm, F, attached to the ends of the adjacent bars A of the side sections, as shown in Figs. 1 and 2. This construction allows the harrow to adjust itself to the most uneven surface of ground.

To the center of the forward cross-bar B of each section is attached the rear end of a short chain, G, the forward end of which is attached to the long draw-bar H, the lengths of the several chains G being so regulated that the draw-bar H may be at right angles with the line of draft.

To the center of the draw-bar H is attached a keeper, I, through which is passed the tongue J. The rear end of the tongue J is pivoted to and between the plate K and hammer-strap L, attached to the beams A of the central section.

To the tongue J, a little in front of the draw-bar H, is pivoted the double-tree M, the play of which is limited by the chains N, attached to its ends, and also attached to the draw-bar H.

The connection between the draw-bar H and the tongue J is strengthened by the hounds or braces O, the rear ends of which are attached to said draw-bar H, and their forward ends are attached to the said tongue J.

Having thus described my invention, I claim as new and desire to secure by Letters Patent—

The combination of the draw-bar H and its chains G, the tongue J and its plate K and hammer-strap L, and the double-tree M and its chains N, with the sections of the harrow-frame, substantially as herein shown and described.

DAVID McILREVEY.

Witnesses:
S. B. DUNTON,
J. C. FELLOWS.